W. H. EDSALL.
CURTAIN ROD BRACKET.
APPLICATION FILED MAY 5, 1911.
1,019,232.
Patented Mar. 5, 1912.
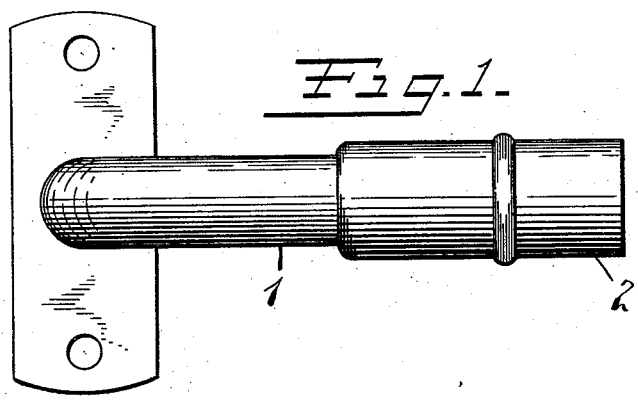
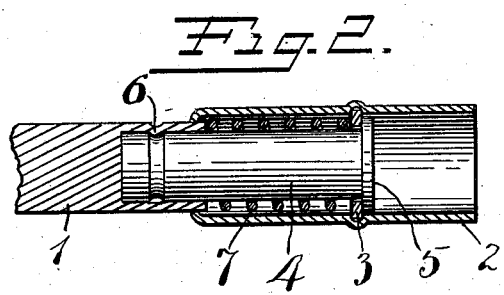
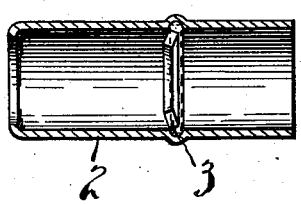
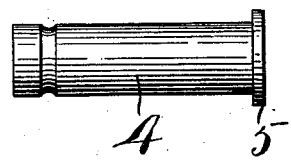
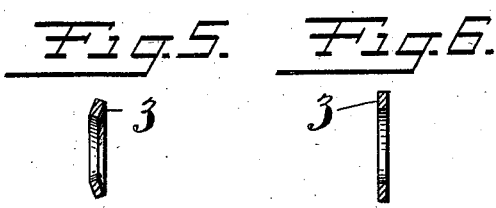
Witnesses:
Inventor
W. H. Edsall
By his Attorneys

UNITED STATES PATENT OFFICE.

WILLIAM H. EDSALL, OF WALLINGFORD, CONNECTICUT.

CURTAIN-ROD BRACKET.

1,019,232.

Specification of Letters Patent. Patented Mar. 5, 1912.

Application filed May 5, 1911. Serial No. 625,204.

*To all whom it may concern:*

Be it known that I, WILLIAM H. EDSALL, a citizen of the United States, residing at Wallingford, New Haven county, State of Connecticut, have invented certain new and useful Improvements in Curtain-Rod Brackets, of which the following is a full, clear, and exact description.

My invention relates to improvements in the construction of curtain rod brackets, the object being to provide a very simple and economical construction.

In the accompanying drawings, Figure 1 is a front elevation of the bracket in a preferred form, the same being relatively enlarged. Fig. 2 is a longitudinal section, partly in elevation. Fig. 3 is a longitudinal section of a detail before completion. Fig. 4 is a side elevation of another detail. Figs. 5 and 6 are sectional views of the same detail.

1 represents the main body comprising an attaching plate provided with a stem portion.

2 represents a sleeve arranged to slide to and fro on the stem 1, the front end of said sleeve being open to receive the end of a rod, the purpose of making the sleeve slidable being to permit the rod to be lined up with the bracket, after which, when the sleeve slides forward, the rod is held in place. The invention relates mainly to the construction whereby the sleeve is mounted and operated. As shown, the sleeve has therein a washer 3 arranged approximately midway in its length, said washer affording an intermediate bearing upon a supporting stud 4, the forward end of which has a head 5, the rear end of which is suitably secured to the stem 1. One effective method of securing said stud to the stem 1 comprises forming a bore in the forward end of said stem and forming a groove or recess in the side of the stud, said groove or recess being located within the bore of the stem 1, so that by forming an indentation, as at 6, said stud will be locked securely in place. 7 is a spring surrounding the stud 4, one end bearing against the forward end of the stem 1, the other end bearing against the rear end of the washer 3, the sleeve loosely surrounding said spring so as to permit it to have free action. The head 5 stands in front of the washer 3. One convenient way of securing the washer 3 in place comprises forming an internal annular groove within the sleeve, cupping the washer as shown in Fig. 3, so that it will slide within the sleeve to a position adjacent to the said groove. By then flattening out the washer the same is expanded into the groove so as to become permanently connected therewith. By this construction the parts may be simply and economically produced and assembled. The completed structure partakes of a graceful appearance, and will be found to be extremely strong and serviceable. As shown, the spring acts in a direction to project the sleeve 2 into the rod engaging position. Whenever it is desired to assemble the rod (not shown) it is simply necessary to grasp the sleeve 2 and push it back against the tendency of the spring, until the forward end of the sleeve approaches the head 5 sufficiently close to become free of the rod and allow the removal of the latter. Broadly speaking, the head 5 and the washer 3 operate as abutments or stops.

I have shown the invention in the preferred form, but obviously it may be modified without departing from the spirit and scope of the following claim.

What I claim is:

In a device of the character described, the combination of an attaching plate provided with a stem portion, a stud of relatively reduced diameter extending from the end thereof; a head on the end of said stud, a sleeve inclosing said stud and loosely bearing upon and sliding over said stem and said stud head, an annular abutment surface fixed within the sleeve between the stem and stud head, and a coiled spring within the sleeve engaging the stem and bearing against said annular abutment to normally extend said sleeve forwardly, said stud head acting as a stop to limit the forward movement of said annular abutment and its sleeve.

WILLIAM H. EDSALL.

Witnesses:
GEORGE W. BAUMAN,
W. E. ATKINSON.

Copies of this patent may be obtained for five cents each, by addressing the "Commissioner of Patents, Washington, D. C."